Dec. 27, 1955  W. S. CRAWFORD ET AL  2,728,432
BIN BATCHING PLANT
Original Filed April 11, 1949
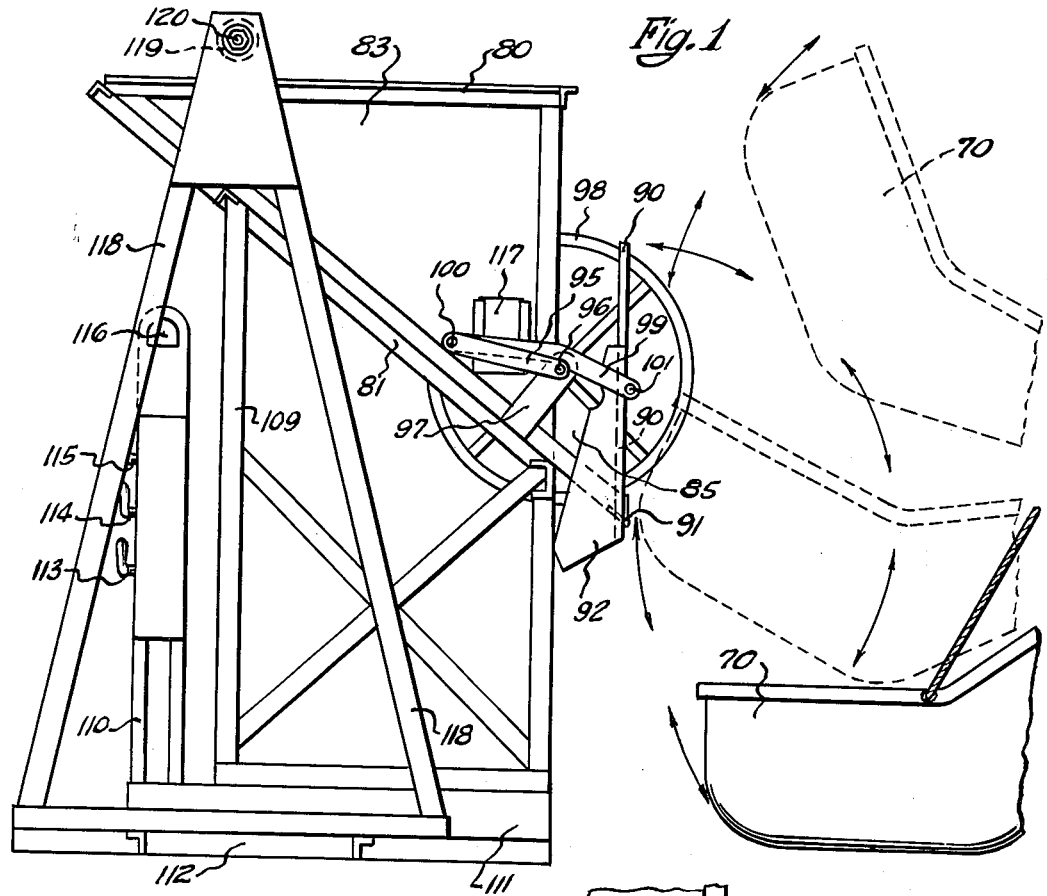
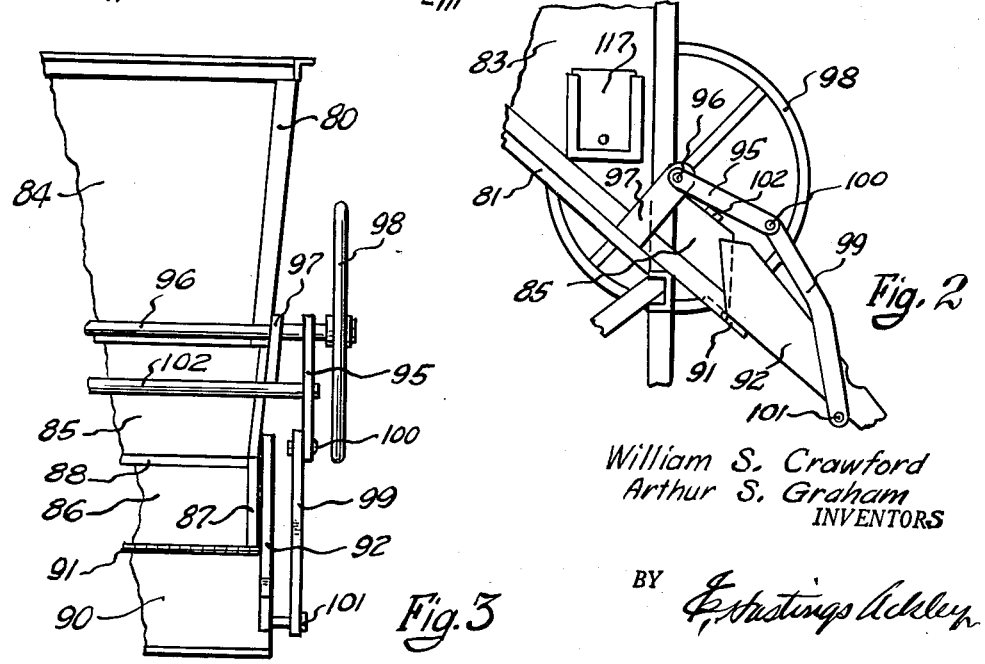
William S. Crawford
Arthur S. Graham
INVENTORS
BY *J. Hastings Ackley*
ATTORNEY

United States Patent Office 2,728,432
Patented Dec. 27, 1955

2,728,432

BIN BATCHING PLANT

William S. Crawford, Dallas, and Arthur S. Graham, Carrollton, Tex.

Original application April 11, 1949, Serial No. 86,618, now Patent No. 2,591,785. Divided and this application December 8, 1951, Serial No. 260,696

1 Claim. (Cl. 193—17)

This invention relates to new and useful improvements in bin batching plants, and is directed more particularly to a small bin batching plant for accurately weighing sand, gravel, crushed rock, or other aggregate, and the like for use in making concrete, said plant being especially suited for use in connection with small portable concrete mixers of three bag capacity or smaller.

This application is a division of our copending application, Serial No. 86,618, filed on April 11, 1949, now Patent No. 2,591,785.

Efficient mixer operation, in the making of mixed concrete in fairly large quantities, requires adequate apparatus to insure a steady supply of successive batches of accurately proportioned materials to the mixer. The batching mechanism for delivering the aggregate to the mixer should be carefully co-ordinated with the mixer, not only to insure uniformity of products but also to minimize idle time for the mixer between mixing cycles.

It is, therefore, an important object of the invention to provide a bin batching plant wherein the bin is mounted on the platform of platform scales, whereby the materials introduced into the bin may be measured by weight to assure correctly proportioned mixes thereof before the materials are delivered from the bin to the mixer.

Another object of the invention is to provide a bin batching plant which is adapted for use with an ordinary portable mixer having a skip into which the materials are discharged from the bin for delivery into the mixer drum, and wherein the bin batching plant is arranged to positively assure delivery of materials from the bin into the skip without spilling and is also so arranged that the plant does not interfere with movement of the skip to an elevated position for discharging the materials from the skip into the mixer drum.

A still further object of the invention is to provide, in a bin batching plant of the character described, means for moving the outlet extension chute of the bin toward and from the skip of the mixer, whereby the materials may be delivered directly from the bin to the skip by gravity and the skip may be elevated without interference by the plant.

Still another object of the invention is to provide a bin batching plant which may be mounted on a vehicle in combination with a mixer, whereby both the plant and mixer are readily portable as a unit.

It is a further object of the invention to provide, in a bin batching plant of the character described, means independent of the bin and scales upon which the loading bucket of the material elevating machine may be tiltably rested or bumped, whereby materials may be accurately delivered from the bucket of such elevating machine into the bin without affecting the measurement of the materials delivered into the bin.

It is also an object of the invention to provide a bin batching plant in which the bin is mounted on the weighing platform of platform scales and the frame of the scales is stationary and wherein the bin is provided with an extensible and retractable outlet chute for delivering materials to the skip of a mixer, said chute when retracted being arranged to close the outlet from the bin and to permit the skip to be elevated without interference by the chute.

Another object of the invention is to provide a bin batching plant of the character described which is simple in structure and economical to manufacture.

Additional objects and advantages of the invention will readily be apparent from the reading of the following description of a device constructed in accordance with the invention, and reference to the accompanying drawings thereof, wherein:

Figure 1 is a side elevation of a bin batching plant,

Figure 2 is a fragmentary side elevation of the outlet chute of the plant showing the chute in extended discharging position, and Figure 3 is a fragmentary front elevation of the bin and chute.

In carrying out the invention, a front tractor loader (not shown) scoops up sand, gravel, stone or other aggregate from piles of such material and elevates and deposits such material in a bin batching plant 80, where the amount of material so deposited is carefully proportioned by weight. The weighed proportioned materials are then delivered from the bin batching plant into the skip 70 of a mixer (not shown) and are discharged from the skip into the rotating drum of the mixer for mixing with water in the usual manner, after which mixed concrete is discharged from the mixer drum for use.

A bin batching plant constructed in accordance with the invention is illustrated in Figures 1 through 3, wherein the platform scales and the bin are stationary and the bin is provided with an extensible and retractable outlet chute for delivering materials from the bin to the skip of the mixer.

This bin batching plant includes a bin 80, having a substantially rectangular open upper end and having its bottom 81 inclined downwardly and forwardly. The side walls 83 of the bin are substantially triangular in configuration and the lower edges of such side walls converge toward their lower end, as clearly shown in Figure 3. The front wall 84 of the bin is substantially vertical and has an outlet opening provided in its lower portion communicating with a rectangular outlet chute mouth 85, whereby material deposited in the bin may discharge through said outlet mouth. The chute mouth is provided with a bottom plate 86 forming a continuation of the bottom of the bin, and has side walls 87 and a top cover wall 88.

Mounted at the lower outer end of the bottom plate 86 of the outlet mouth is an extension chute and closure gate 90 which is connected with said bottom plate by a hinge 91, so that the chute extension may be swung on the hinge from a position closing the open end of the mouth, as shown in Figure 1, to a position forming an extension of the mouth, as shown in Figure 2. The extension chute is provided with side walls 92, so that when it is in extended position it forms a continuation of the outlet mouth 85 for delivering materials from the bin into the skip 70 of the mixer. When in the elevated retracted position, shown in Figure 1, the extension chute and closure gate 90 abuts against the open end of the outlet mouth 85 to close the same to prevent discharge of materials from the bin.

For moving the extension chute and for holding it in its retracted and extended positions, crank arms 95 are swingably mounted at each end of an elongate shaft 96 which is rotatably mounted in bearing support members 97 carried by the side frames of the bin so that the shaft is positioned adjacent the upper end of the outlet mouth. The crank arms are provided at each side of the outlet mouth, and are connected with the outer end of the extension chute by means of connecting links 99 which are each connected at one end by a pin 100 to the outer end of one of the crank arms 95 and at their other end to the outer end of the extension chute 91 by a pin 101. The connecting links are bent at an angle between their ends, as illustrated in Figures 1 and 2, whereby when the crank arm and connecting links are in the retracted position, shown in Figure 1, the shaft 96 is positioned at a point, in the bend of the connecting links, past a line between the pins 100 and 101 at the ends of the connecting links. Thus, any force applied against the extension chute by material in the outlet mouth 85 would tend to pull the connecting link 99 outwardly, but since the line of pull against the pin 100 is below the center of the crank shaft 96, such outward force tends to swing the crank arms 95 in a counter-clockwise direction and thus urges the connecting links 99 into tighter engagement with the crank shaft. The extension chute is therefore locked in closed position.

When the hand wheel 98 is turned to swing the crank arms 95 outwardly to move the extension chute to extended position, the rotative movement of the crank arms is limited by an elongate stop member 102 fixedly secured to the upper wall of the outlet mouth. The engagement of the crank arms with the stop member prevents further rotative movement of the crank arms and thus supports the extension chute in the extended position, as shown in Figure 2.

If desired, lengths of chain or flexible cable may be connected at one end with the outer end of each side of the extension chute and at their other end with the upper portion of the frame of the bin, whereby the chute is positively supported by the chains or cables when the chute is in extended position.

When the chute is retracted, as shown in Figure 1, the skip 70 of the mixer may be elevated past the chute without interference. However, when the chute is extended in the manner shown in Figure 2, the outer end of the chute is disposed above the open upper end of the skip and materials may flow from the bin into the skip.

The bin 80 is mounted on the upper end of a frame 109, which is carried on the weighing platform of a platform scale 110. The scale frame 111 is securely fixed on a base frame 112, which may be supported on the ground or on the frame of a wheeled vehicle carrying both the bin batching plant and the mixer, to provide a compact portable combination unit or assembly. The weighing mechanism of the platform scale is conventional in form and includes the usual upright having provided therein a plurality of scale beams, each of which is separately connectible with the platform of the scales so as to be selectively operable separately or in conjunction with each other, so that the weights of different types of material introduced into the bin may be determined cumulatively. Thus, one beam may be placed in operative position by moving a release lever 113 to connect the beam with the platform, so that when the proper amount of material has been introduced into the bin an indicator 116 at the upper end of the scale riser will show that the weight of the material in the bin has reached the desired proper value. Then, a second release lever 114 may be turned to bring into action a second scale beam, having a predetermined weight setting, to permit the introduction of additional material into the bin in a predetermined quantity by weight, the indicator 116 showing such quantity of material has been introduced. If desired, a third release lever 115 may then be turned to connect a third scale beam with the platform of the scale for indicating when an additional amount of another ingredient or material introduced into the bin has reached a desired value by weight.

The quantities of material introduced into the bin are weighed cumulatively; that is, the weight of the first introduced material is indicated by the first beam, and when the second beam is placed in operative condition, the weight of the second material introduced into the bin will be added to the weight of the first material to cumulatively act upon the scale beams to indicate when the proper weight of the second material has been delivered into the bin. Obviously, the number of beams on the scale may vary in accordance with the requirements of the user, and the number of beams actually placed in use may likewise be determined by the user.

A fixed roller supporting frame having risers 118 on each side of the bin is secured to the rear portion of the base frame 112 and carries at its upper end a roller bumper or rest bar 119 which is rotatably mounted on a shaft 120 secured to the upper end of the frame risers on each side of the bin so as to be independent of and spaced above such bin. This rest or bumper roller is provided for the purpose of supporting the bucket or scoop 60 of the front tractor loader (not shown), so that the scoop bucket may be tilted to unload or dump sand, gravel or other aggregate into the bin in controlled quantities without applying the weight of the scoop to the bin. Thus, only the true weight of the materials introduced into the bin are registered by the scale indicator.

When the desired proportions of sand, gravel, and other material have been dumped into the bin, the skip 70 of the mixer is lowered into receiving position, and the hand wheel 98 is turned to swing the crank arms 95 so that the extension chute 90 is moved to the extended position shown in Figure 2. This movement of the extension chute opens the lower end of the outlet mouth 85 from the bin and permits materials in the bin to flow through the mouth and along the chute into the skip of the mixer. When the materials have been discharged from the bin into the mixer skip, the hand wheel 98 is turned in the opposite direction to swing the extension chute 90 to the retracted closed position shown in Figure 1, whereupon the mixer skip may be raised past the bin batching plant to discharge the materials from the skip into the mixer drum. With the extension chute in the retracted position, the outlet mouth 85 from the bin is closed and the bin may be recharged with the desired proportion of material and the operation repeated.

As has already been pointed out, the base frame 112 of the bin batching plant may be mounted on the frame (not shown) of a wheeled vehicle, together with the mixer, to provide a compact portable combination unit. The structure of the bin batching plant in such event would be modified only by shortening the height of the frame 109 to position the outlet mouth and extension chute of the bin closer to the skip of the mixer.

From the foregoing, it will be seen that a small bin batching plant has been provided wherein the bin is mounted on the weighing platform of a platform scale so that materials introduced into the bin may be measured by weight to assure correctly proportioned mixes therebefore the materials are delivered from the bin to the mixer. It will also be seen that, in both forms of the invention, the proportioned materials are delivered from the bin of the plant into the skip by gravity without spilling and without interfering with the operation of the mixer skip.

It will further be noted that a small portable bin batching plant has been provided which may be constructed and operated as a unit separate from the mixer, or which may be mounted on a wheeled vehicle with the mixer to provide a compact portable combination unit which is constantly in proper operating relationship.

It will further be seen that the bin batching plant is provided with means, independent of the bin and scale, upon which the loading bucket of the material elevating machine may be tiltably rested or bumped to assure delivery of materials from the elevating machine into the bin without affecting the measurement of the materials delivered into the bin.

Likewise, the unit is manifestly simple in structure and economical to manufacture, and provides a plant for positively and accurately proportioning materials to be used in the manufacture of concrete which is so simple in operation that an unskilled laborer may be used for proportioning the materials and delivering them in such correct proportions to the mixer.

Furthermore, it will readily be seen that the bin batching plant is operable by a single laborer, thus producing the desired outlined results with a minimum of labor costs.

The foregoing description of the invention is explanatory only, and changes in the details of the construction illustrated may be made by those skilled in the art, within the scope of the appended claim, without departing from the spirit of the invention.

What we claim and desire to secure by Letters Patent is:

A bin batching plant including, a bin having an elongate inclined wall member forming the rear and bottom wall of the bin and having substantially triangular side walls joined at their lower edges to the inclined wall member and a front wall joining the side walls and terminating short of the bottom wall to provide an outlet opening across the front of the bin coextensive with the bottom wall; an outlet chute mouth having a bottom forming an extension of said bottom wall, a top cover wall joined to the lower edge of said front wall, and a pair of side walls extending from the side walls of said bin and connecting said bottom and said cover wall; and a closure gate secured to said outlet chute for pivotal movement about an axis at the lower outer end of the bottom wall of said outlet chute and having a bottom and a pair of sides, said sides being disposed outwardly of said side walls of said outlet chute, said closure gate being movable to a lower open position above a mixer skip to form a chute when said skip is in lowered position for delivering material from the bin to the skip, and movable to an upper closed position wherein said bottom of the closure gate abuts the outer ends of the side and cover walls of the outlet chute and closes said outlet chute, said closure gate when in the latter position being clear of the arc of travel of the skip from lowered loading position to elevated emptying position; and means for moving said closure gate between open and closed position including, a rotatable shaft mounted on said bin and disposed behind and parallel to said axis about which the outlet chute is pivoted, a pair of crank arms rigidly mounted on said shaft, a pair of links, each of said links having one end pivotally connected to said closure gate and the other end pivotally connected to one of said crank arms, said links having opposite end portions extending angularly from an intermediate point of each of said links whereby when said closure gate is in closed position the ends of said links are disposed on one side of a diametrical line of said shaft and said intermediate points of said links are disposed on the opposite side of said line so that any force exerted on said gate closure by material in said bin tends to lock said closure gate in closed position.

References Cited in the file of this patent
UNITED STATES PATENTS

| | | |
|---|---|---|
| 432,952 | McLean | July 22, 1890 |
| 666,983 | Spencer et al. | Jan. 29, 1901 |
| 718,742 | Umholtz | Jan. 20, 1903 |
| 752,555 | Holmes | Feb. 16, 1904 |
| 792,735 | Seaver | June 20, 1905 |
| 920,415 | Bathrick | May 4, 1909 |
| 1,585,062 | White | May 18, 1926 |
| 1,614,373 | Lepley | Jan. 11, 1927 |
| 1,688,600 | Slifer | Oct. 23, 1928 |
| 1,837,685 | Smith | Dec. 22, 1931 |
| 1,871,559 | Reed | Aug. 16, 1932 |
| 2,109,534 | Johnson | Mar. 1, 1938 |
| 2,135,440 | Longnecker et al. | Nov. 1, 1938 |